June 14, 1949.                L. THOMPSON ET AL                2,473,351
                  LOCKING DEVICE FOR TELESCOPIC CONNECTIONS
                              Filed Oct. 15, 1948

Inventors
Luke Thompson
David T. Wilson
By Frederick C. Bromley
                    Attorney Patented June 14, 1949

2,473,351

UNITED STATES PATENT OFFICE 2,473,351

LOCKING DEVICE FOR TELESCOPIC CONNECTIONS

Luke Thompson, Downsview, Ontario, and David T. Wilson, Toronto, Ontario, Canada Application October 15, 1948, Serial No. 54,788
In Canada December 24, 1947

7 Claims. (Cl. 248—191)

1

The invention appertains to telescopable members such as those employed as legs of tripods, music stands and display stands, and is of general utility as a locking device for telescopic connections in order to secure interfitted parts in set position.

The invention has as its object the provision of a locking device comprising a roller having an eccentric bore by which it is rotatably mounted on an eccentric pin rigid with the inner member of a telescopic joint so that when the inner member is turned relative to the outer member in which it is sleeved the eccentric pin will function to throw the roller from a concentric position to an eccentric position, whereby it is brought into locking engagement with the outer member. In practice it has been ascertained that the roller should be an excessively loose fit on the eccentric pin in order to assure of its contacting the outer member for establishing frictional engagement therewith to bring about the locking action when the inner member is turned.

The roller constitutes an eccentric, and in its non-locking position its axis is aligned with that of the inner member. When the roller is turned to its locking position its axis is offset with respect to the axis of the inner member. In this position the roller binds against a side of the passage of the outer member and the inner member is thrust laterally against the opposite side of said passage. Preferably a loose ring is used on the inner member to take the lateral thrust, which enables the inner member to be turned between locking and non-locking positions with a minimum of effort.

The invention provides a firm and secure locking arrangement by which the components of a telescopic connection can be quickly and easily set and locked in adjusted position. The locking arrangement is inexpensive to manufacture and is highly servicable in use.

By way of illustration the invention is shown as applied to the legs of a tripod in the accompanying drawing.

Figure 1:
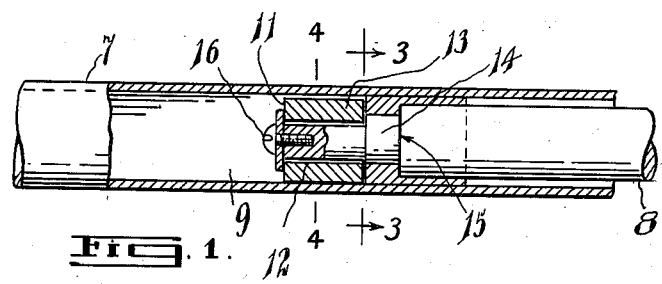
Fig. 1 is a fragmentary view, partly in section, of the telescopic joint of one of the legs of the tripod showing the locking device of the present invention.
Figure 2:
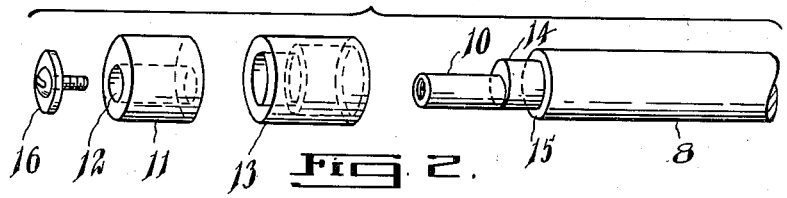
Fig. 2 is an exploded view in perspective of the locking device.
Figure 3:
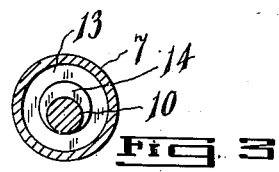
Fig. 3 is a cross section on line 3—3 of Fig. 1.
Figure 4:
Fig. 4 is a cross section on line 4—4 of Fig. 1.
Figure 5:
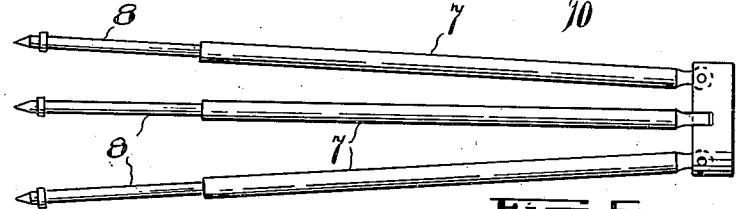
Fig. 5 is a side view of the tripod.

2 how its inner and outer members are turned to lock them in set position.

Each leg of the tripod is comprised as usual of a tubular outer member 7 sleeved on an inner member 8 to provide for telescopic adjustment. The inner member is shown as a solid rod freely slidable in the passage 9 provided by the tubular outer member.

In carrying out the invention the inner end of the inner member is turned down to provide a rigid pin 10 eccentrically disposed to the axis thereof. On this pin there is rotatably mounted a roller 11 which is supplied with an eccentric bore 12 to receive the pin. The roller is made a slide fit in the passage 9 and the eccentricity of its bore 12 corresponds to that of the pin. Consequently the roller can be turned to a position in which it is concentric with the inner member, which is its non-locking position and when in this position the inner member is free to slide endwise for purposes of adjustment.

When relative angular movement takes place between the roller and the inner member the roller is swung eccentrically of the inner member which causes it to bind against a side of the passage and at the same time the adjacent end portion of the inner member is thrust against the opposite side of the passage, which results in a firm and secured clamping effect. In this way the inner member is locked in any position in which it is set.

The lateral thrust on the inner member is taken by a loose ring 13 which is made a slide fit in the passage 9 and is fitted on a section 14 of the inner member. Said section 14 is formed by a concentric reduction in the diameter of the inner member 8 adjacent to the roller. The ring is concentrically apertured and is shouldered against endwise movement between the roller and the radial face 15.

Any suitable expedient may be resorted to in order to limit endwise movement of the roller. By way of example a screw 16 may be employed.

In practice it has been found desirable that the roller should be fairly loose on the pin so that there is considerable play which will enable a side of the roller to touch a side of the passage at all times so as to maintain a frictional engagement sufficient to resist the tendency of the roller to turn with the inner member when the inner member is being turned to bring about the locking action. For this purpose the bore of the roller has a tolerance in excess of that required for a running fit.

Figure 6:
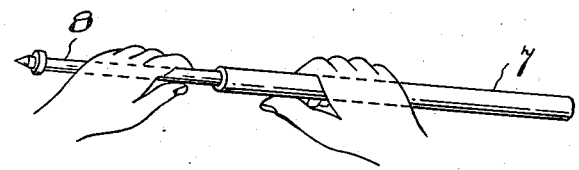
Fig. 6 is an aspect of one of the legs showing

In the use of the locking device the inner member is turned by hand relative to the outer member to bring about the locking action, as shown in Fig. 6. The turning movement throws the roller away from its concentric position and into an eccentric position thereby causing it to bind against a side wall portion of the outer member and at the same time forcing the ring 11 against the opposite side wall portion of the outer member. In this manner the inner and outer members are securely locked in set position, but can be readily released by reverse movement. The locking device has been found to be very effective and will sustain a load far in excess of a conventional locking device.

What is claimed is:

1. In combination a telescopic connection comprising an inner member, an outer member providing a passage in which the inner member slides, and an eccentric journalled on said inner member by an eccentric axis for turning from a concentric position to an eccentric position by angular movement of said inner member relative to said outer member, whereby the eccentric is caused to bind against a side of said passage and the inner member is caused to bind against the opposite side thereof to produce a locking action.

2. A structure as claimed in claim 1, in which the eccentric is disposed at the inner end of the inner member, and is a roller-like element arranged to slide endwise in the passage of the outer member in making telescopic adjustment.

3. A structure as claimed in claim 1, in which anti-friction means is provided on the inner member adjacent to the eccentric to take the lateral thrust thereon in the locking action.

4. A structure as claimed in claim 1, in which a rotatable ring is concentrically mounted on the inner member adjacent to the eccentric and is of a diameter suitable for taking the lateral thrust thereon in the locking action.

5. In a telescopic structure comprising a tubular outer member and an inner member having an inner end slidable therein and capable of being relatively rotated, a locking device including a pin rigid with the inner end of said inner member and disposed eccentrically of the axis thereof, and a roller having a bore by which it is journalled on said pin for turning from a position concentric with said inner end to a position eccentric thereof when said inner member is turned relative to said outer member, said roller being of a diameter such as to be thrust against a side of said passage so as to force said inner end against the opposite side thereof to lock the inner member in a set position.

6. A structure as set out in claim 5, in which the bore of the roller has a tolerance considerably in excess of a running fit in order to assure that the roller will be in tactual engagement with the passage of the outer member at all times.

7. A structure as set out in claim 5, in which means are provided to limit endwise movement of the roller and in which the inner end of the inner member is turned down to provide a section of a reduced diameter on which is journalled a ring for taking lateral thrust in the locking action.

LUKE THOMPSON.
DAVID T. WILSON.

No references cited.